Feb. 6, 1945. B. F. KEHRER 2,369,054
DRIFT AND SHOAL-WATER WARNING DEVICE FOR MARINE VESSELS
Filed April 21, 1941 2 Sheets-Sheet 1
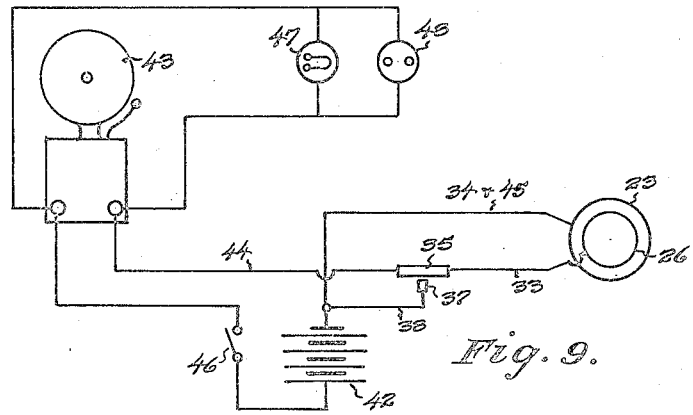
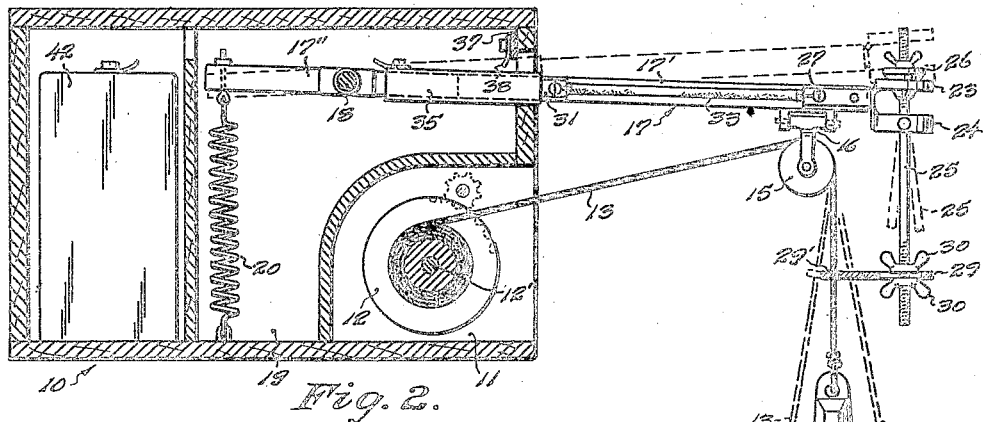
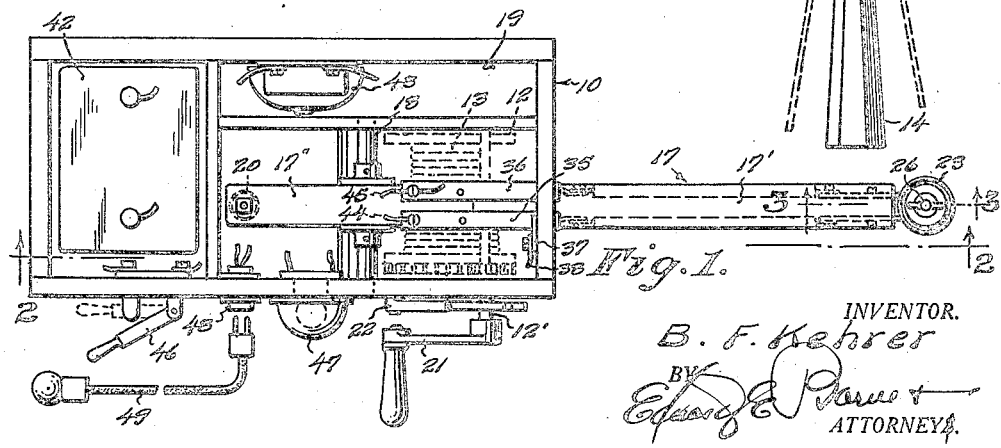
INVENTOR.
B. F. Kehrer

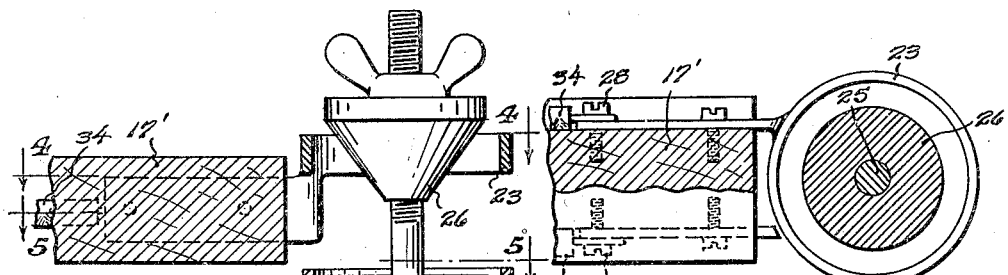
Fig. 3.  Fig. 4.
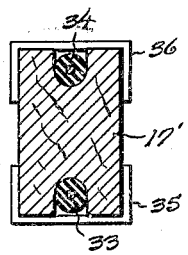 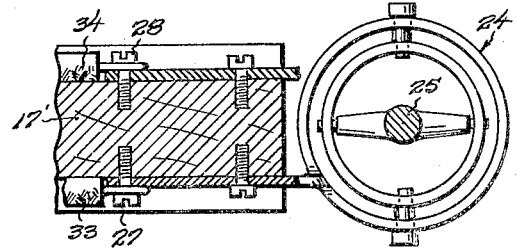
Fig. 7.  Fig. 5.
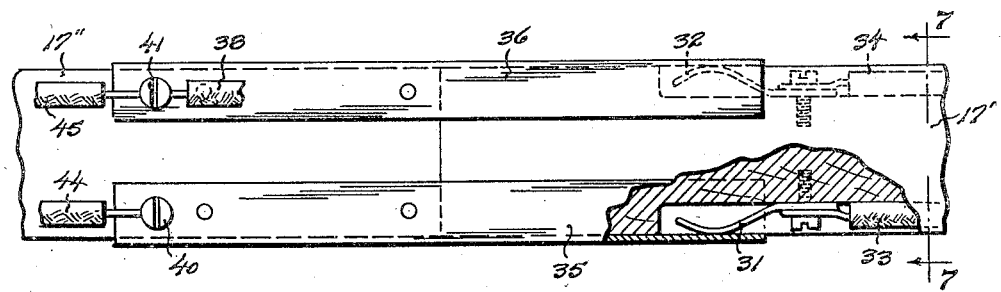
Fig. 6.
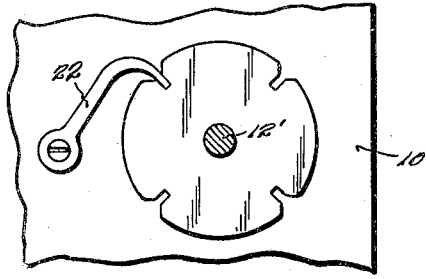
Fig. 8.
INVENTOR.
B. F. Kehrer
ATTORNEYS.

Patented Feb. 6, 1945

2,369,054

UNITED STATES PATENT OFFICE 2,369,054

DRIFT AND SHOAL-WATER WARNING DEVICE FOR MARINE VESSELS

Bertram F. Kehrer, Seattle, Wash.

Application April 21, 1941, Serial No. 389,520

11 Claims. (Cl. 177—311)

This invention relates to a warning device for use on marine vessels and, more especially, to a device serving the two-fold end of warning the operator of an anchored vessel upon a drift of the vessel from its anchored station, and of warning a vessel's operator, who is working into or over shoal waters, of a depth condition within predetermined hazard limits.

It is the general object of the invention to provide a device functioning to accomplish the above ends.

Other and more particular objects and advantages will appear in the course of the following description and claims, the invention consisting in the novel construction, and in the adaptation and combination of parts hereinafter described and claimed.

In clarification of the foregoing object and of the following description of the several views of the accompanying drawings, it may be here stated that the salient feature of the invention is a sounding lead hung from the vessel by a sounding line or equivalent suspending agent in such a manner that the lead is held at a predetermined depth and, by the instrumentality of either relieving the line of its weight or of trailing outwardly sufficient to locate the line at an angle to the perpendicular indicative of an unnatural drift, functions to close an electric circuit including a warning signal.

In said drawings:

Figure 1 is a top plan view of a device embodying the present invention, the top being removed from the casing and dotted lines being employed to indicate the spool which is mounted in a lower compartment and carries the sounding line of the device.

Fig. 2 is a longitudinal vertical section on line 2—2 of Fig. 1.

Fig. 3 is a fragmentary longitudinal vertical section taken to an enlarged scale on line 3—3 of Fig. 1 to detail the gimbal-hung mechanism which, as one of two circuit-closing switches, functions to energize a warning signal upon an angular positioning of the sounding line such, for example, as would occur upon a vessel dragging its anchor to such an extent that a rapid drift of the vessel would develop.

Fig. 4 and Fig. 5 are each fragmentary horizontal sections taken, respectively, one lines 4—4 and 5—5 of Fig. 3.

Fig. 6 is a fragmentary top plan view detailing the vertically-movable lever arm which functions independently of the gimbal-hung mechanism as a circuit-closing switch to energize the warning signal, the movement of the lever arm in its circuit-closing action occurring upon a release therefrom of the weight of the sounding lead such, for example, as by a resting of the lead upon the sea bottom.

Fig. 7 is a transverse vertical section on line 7—7 of Fig. 6.

Fig. 8 is a fragmentary side elevational view detailing the dog assembly by means of which the spool is locked against movement to hold the sounding lead at a selected depth; and Fig. 9 is a diagrammatic view of the signal-controlling electric circuit which I employ.

Referring to the drawings, the numeral 10 denotes a casing provided in its bottom portion with an open-end compartment 11 to receive a spool or drum 12 on which is wound a line 13 for a sounding lead 14, the line being arranged to pass over a pulley 15 swivel-mounted by a hanger 16 from the outer end of a lever arm designated generally by 17. Fulcrumed as at 18 in a compartment 19 separate from the spool compartment for movement about a transverse horizontal axis, the lever arm is normally depressed by the weight of the lead in opposition to the elevating influence of the indicated spring 20. 21 represents a crank, and 22 a locking dog for the spindle 12' of the spool.

Considering now the two switches hereinbefore referred to, the one being operable by an elevational movement of the lever and the other by a positioning of the sounding line at a predetermined angle of lateral deflection, the latter is mounted at the extreme end of the lever arm in longitudinally spaced relation beyond the pulley 15 but is functionally independent of the lever.

Describing first the latter of the two switches, it will be seen that I provide a relatively stationary ring 23 and, disposed centrally thereof in a gimbal-mounting 24, a perpendicular rod 25 on which is a conical nut 26, the nut being adjustable toward and from the horizontal plane of the ring and with the latter acting as the two circuit-closing terminals of a normally open electric circuit including binding posts 27—28. It is believed to be clear that the sensitivity of the switch is determined by the adjustment of the nut 26, and to effect the circuit-closing angular deflection of the rod in unison with a corresponding angular deflection of the sounding line I employ at the lower end of the rod a lateral extension 29 having at its outer end a reeve-way 29' for the line. As a means of adjusting the rod toward and from said reeve-way to center the rod in relation to the ring 23 I slot the extension longitudinally and clamp the same in a selected longitudinally shifted position relative to the rod by means of thumb nuts 30, compensation being thereby had for variations, relatively speaking, in the plumb line of the sounding lead according as the casing is given a horizontal or an inclined mounting upon the vessel.

To facilitate a storing of the device within a ship's locker, the lever arm is of two-piece construction providing an outer part 17' having a telescoping fit within a socket therefor provided by an inner part 17", and to make an electrical connection through this telescoping joint I provide spring fingers 31—32 connected by wires 33—34 to the binding posts 27—28 and themselves making brush contact with channel-pieces 35—36 forming the socket.

Acting to produce the other of my two circuit-closing switches, one of the channel-pieces, namely the piece 35, is complemented by a plate 37 fixed within the compartment 19 in the path of lever-influenced elevational movement of such piece 35, the plate being connected electrically to the channel-piece 36 by a wire 38.

Completing the electric circuit, binding post 40—41 on the channel-pieces 35—36 are connected in series with a dry-cell battery 42 and an electrically-energized warning bell 43 by wires 44—45, and with a manually-operated knife switch 46 being preferably employed to isolate the battery during storage periods. It is desirable that the device be provided, in addition to the audible signal 43, with a visible signal such as the incandescent lamp 47, and it is also desirable that the electrical hook-up include a socket, as 48, for the attachment of an extension cord 49 (Fig. 1) in order thereby to locate a warning signal at any desired point on the vessel.

While I have shown the device as a portable unit, its adaptability to a built-in installation is obvious.

Assuming the sounding lead to have been let out to the depth considered sufficient for the safety of the vessel, the operation of the device is as follows:

Upon a contact of the lead with the sea bottom the lever is caused to elevate with a resulting energizing of the warning signal or signals by a circuit-closing contact of the switch last described, which is to say the switch comprised of the channel-piece 35 and the fixed plate 37. Such a freeing of the weight of the lead might occur while the vessel lays at anchor, due to a drift or from the ebb of the tide, or while working the boat into shoal waters or over rock-strewn bottoms. It is of course to be understood that an operator in working into shoal waters reduces the speed of the vessel to a point whereat little if any swing is imparted to the lead line 13. A slight angularity will of course be imparted to such line, and in order that this angularity will not operate to close a circuit by the contact of the gimbal-mounted nut 26 with the complementary ring 23, the former is backed off sufficiently to obviate the same. In so working the vessel with the motor running, and with the device applied at the bow of the boat, a single operator occupying a piloting position at the stern is warned upon contact of the lead with the bottom by the instrumentality of providing the visible signal 47 where, as may frequently be the case, the motor noise is sufficiently loud to drown the audible signal 43. Considering the drift-warning function of the device—usable only when the vessel lies at anchor—it is thought to be apparent that a drifting travel of the vessel at a speed in excess of the natural movement caused by wind and tides, and which would of course be caused only in the event of the vessel either slipping or dragging its anchor, would cause the lead to trail outwardly and upon reaching a predetermined angularity from the plumb line obtain circuit-closing contact between nut 26 and ring 23 to warn the operator of the danger to the vessel's safety. An operator, when anchoring his vessel, sets the nut 26 to the degree of sensitivity which the weather conditions require, having recourse to a barometer, which is to say that the nut would be set down relatively close to the ring in quiet waters and set to a greater span relatively in correspondence with the extent to which the vessel is caused to roll under the influence of rough-water conditions then obtaining or expected to obtain. The device is particularly intended for use on pleasure craft operating within sheltered waters, rather than upon deep-sea vessels.

Numerous departures from the illustrated and described structure should readily occur to those versed in the art, and I accordingly intend that no limitations be implied excepting as the same are necessarily brought into the hereto annexed claims to define the present invention over the previous state of the art.

What I claim, is:

1. In a drift-warning device for marine vessels: the combination of a means arranged and adapted to be suspended from the vessel to lie in submerged relation: and capable of being freely deflected in all directions about its point of suspension as a pivotal axis in response to relative motion as between the vessel and the water; and an audible warning signal operable by such an angular deflection of said suspended means as exceeds a predetermined normal.

2. In a drift-warning device for marine vessels at rest: the combination of an electric warning signal; and means pivotally suspended from the vessel and acting in response to a relative motion in any direction as between the vessel and the water exceeding a predetermined normal for closing a normally-open electric circuit including said warning signal.

3. In a drift-warning device for marine vessels at rest: the combination of a warning signal inactive under a given normal condition of vessel movement; and means for energizing said signal operating in response to a relative motion in any direction as between the vessel and the water exceeding said given normal movement.

4. In a drift-warning device for marine vessels at rest: the combination of a warning signal; and means including a weight suspended from the vessel to lie in submerged elevated relation above the sea bottom, arranged for universal movement about its point of suspension as an axis, and functioning to actuate the warning signal upon a movement of the weight, from a plumb line, beyond a predetermined normal maximum deflection.

5. In a warning device for marine vessels at rest: the combination of a plumb device adapted to be suspended from the vessel to lie in submerged elevated relation above the sea bottom; and a warning signal functionally associated with said plumb device and actuated either by a grounding of the plumb device or by a movement of the latter beyond a predetermined maximum of normal angular deflection.

6. In a warning device for marine vessels at rest: the combination of a plumb device adapted to be suspended from the vessel to lie in submerged elevated relation above the sea bottom; a warning signal; a normally open electric circuit for energizing said signal; a switch functionally associated with the plumb device for closing said circuit to energize the signal upon a grounding of the plumb device; and a switch independent of said first-named switch functionally associated with the plumb device and also operating to close said circuit for energizing the signal upon a movement of the plumb device beyond a predetermined maximum of normal angular deflection.

7. The combination of claim 6 in which the first-named switch includes a lever arm supported for movement about a horizontal axis and suspending the plumb device from the free end of the same, and in which the last-named switch includes a gimbal-mounted rod supported on said free end of the lever and having functional connection to said plumb device for responsive movement therewith.

8. A drift-warning device for marine vessels at rest comprising, in combination: an electrically energized warning signal; a gimbal-mounted rod; a plumb device suspended from the vessel to lie in submerged elevated relation above the sea bottom; operative interconnection from the plumb device to the gimbal-mounted rod acting to cause deflection of the rod about the gimbal mounting as an axis relatively in correspondence with movement of the plumb device out of plumb; a ring disposed concentric to a line taken perpendicularly through the substantial center of the gimbal mounting and surrounding the rod in axially removed relation to said gimbal mounting, said ring being normally spaced from the rod but lying within a given range of abnormal deflection of the latter; and a normally open electric circuit for the warning signal including the gimbal-mounted rod as one terminal and the ring as the other terminal of a circuit-closing switch operable to energize the signal upon a movement of the rod beyond a predetermined maximum of normal deflection.

9. In a depth-warning device for marine vessels: the combination of a normally open electric circuit including a warning signal and an above-water circuit-closing switch; a sounding lead arranged and adapted to be suspended from the vessel at a selectively variable depth defining a predetermined hazard level; and a member made subject to the weight of the lead and operatively associated with the switch to cause the latter, by the influence of the applied weight, to normally remain open; and a power means normally overpowered by the inherent weight of the freely suspended lead and acting upon the member counter to the influence of the lead to effectuate a closing of the switch as the member is relieved of the weight of the lead by a grounding of the latter.

10. Structure according to claim 8 having regulating means permitting the gap which normally obtains between the two terminals of the circuit-closing switch to be increased or decreased as may be distated by weather conditions prevailing, thus to adjustably control the device by governing the degree of deflection necessary to cause circuit-closing contact between the two terminals.

11. Structure according to claim 8 having means arranged and adapted to constitute a control governing the functioning relationship between the two terminals of the switch in terms of the degree of deflection necessary to cause circuit-closing contact as between the two said terminals.

BERTRAM F. KEHRER.